(No Model.)
S. E. KIEROLF.
BUILDING BLOCK.
No. 535,908. Patented Mar. 19, 1895.
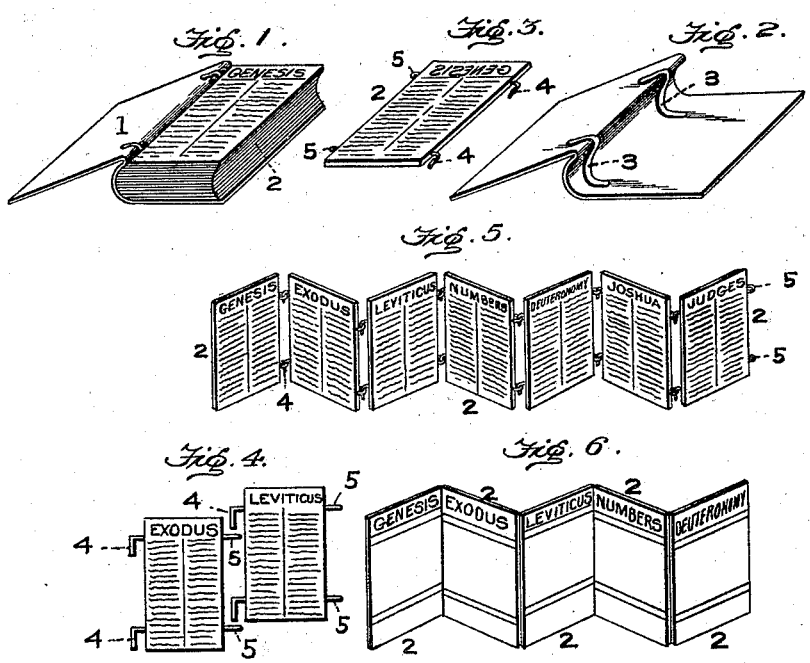
Witnesses:
Wm C. Dashiell
H. F. Benhard
Salem E. Kierolf.
Inventor.
By Edson Bros.
Attorneys.

UNITED STATES PATENT OFFICE.

SALEM E. KIEROLF, OF JACKSON, TENNESSEE, ASSIGNOR OF ONE-HALF TO ROBERT A. HURT, OF SAME PLACE.

BUILDING-BLOCK.

SPECIFICATION forming part of Letters Patent No. 535,908, dated March 19, 1895.

Application filed January 25, 1894. Serial No. 498,041. (No model.)

*To all whom it may concern:*

Be it known that I, SALEM E. KIEROLF, a citizen of the United States, residing at Jackson, in the county of Madison and State of Tennessee, have invented certain new and useful Improvements in Building-Blocks; and I do hereby declare the following to be a full, clear, and exact description of the invention, such as will enable others skilled in the art to which it appertains to make and use the same.

My invention relates to building blocks in the form of a book with detachable or separable leaves which can be taken from the cover and set up or arranged so as to expose to view the printed matter on the leaves; and the object of the invention is to provide a simple and inexpensive construction by which the leaves or pages can be compactly arranged within the cover and also by which the leaves can be detached to expose them so that the contents thereof can be easily read by Sunday-school scholars or others engaged in studying, or teaching from, the Bible.

With these ends in view, my improvement consists in the construction and arrangement of parts which will be hereinafter fully described and defined by the claims.

To enable others to understand my invention I have illustrated the preferred embodiment thereof in the accompanying drawings, forming a part of this specification, and in which—

Figure 1 is a perspective view of the booklike block, with the front cover thereof in an open position. Fig. 2 is a perspective view of the cover, with the leaves detached. Fig. 3 is a detail perspective view of one of the leaves. Fig. 4 is an elevation showing the method of adjusting two of the leaves to connect them together. Fig. 5 is a perspective view of a series of leaves connected together and showing them adjusted to be self sustaining. Fig. 6 is a view similar to Fig. 5, illustrating a series of leaves or pages arranged to be self sustaining, but showing a different means for connecting the pages together.

Like numerals of reference denote corresponding parts in all the figures of the drawings.

In the embodiment of my building block, it consists of the cover, 1, and a series of leaves, 2, which are detachably fastened within the cover. This cover, 1, is made square, oblong, or of any other preferred shape and of appropriate size to serve the purposes as a building block, and the cover consists of the two outside leaves united by a suitable back. The leaves, 2, are preferably in the form of stiff cards or sheets adapted to be folded compactly between the outside leaves of the cover, and each card, 2, is printed or otherwise inscribed with a chapter of the Bible or a condensed summary of one of the books of the Bible. The leaves may be held together or to the cover, 1, in any suitable way. I prefer to provide the cover with the transverse metallic strips or bands, 3, within the back thereof, and each leaf is provided with the hooks, 4, which hooks are suitably fastened to one edge of the card, 2, and adapted to engage with the strips, 3, to hold the cards within the cover. The leaf or card is further provided on its opposite edge with the eyes, 5, and when the leaves are detached from the cover, they can be placed on end and interlocked together by fitting the hooks, 4, of one leaf into the eyes, 5, on the adjacent leaf, thereby displaying the contents of the leaves or cards to view for convenient reference, as shown by Figs. 5 and 6, of the drawings. It is evident that the leaves can be readily disconnected from the cover and set up in the form shown by Figs. 5 and 6, or they can be separated one from the other and connected to the cover, as shown by Fig. 1, in which condition the block formed by the cover and cards can be used in the construction of a temple or other structure.

As another means of connecting the cards together, they may be joined at their edges by the tapes or strips shown by Fig. 6, which provide the flexible hinges or joints that adapt the cards to be turned either way and to different angular positions relative to each other and make the cards self-sustaining in order to expose the printed matter thereon.

One of the advantages of the building block with the series of detachable cards within the cover is that the cards can be removed and suspended on a wall or within a frame in a manner to represent a temple or other building.

Having thus fully described my invention, what I claim as new, and desire to secure by Letters Patent, is—

1. A book-like block comprising a cover having transverse strips or bands within the same, and a series of detachable leaves, each leaf provided at one edge with hooks to engage said bands and provided, at its other edge, with eyes, whereby the hooks and eyes may be interlocked together when the leaves are detached and their leaves arranged to be self-sustaining, for the purposes described, substantially as set forth.

2. A book-like block comprising a cover, and detachable leaves or cards provided with means to engage with the cover and said cards having interlocking devices by which the opposite edges of each card can be connected to other cards when they are removed from the cover, substantially as described.

In testimony whereof I affix my signature in presence of two witnesses.

SALEM E. KIEROLF.

Witnesses:
W. H. TIDWELL,
SAM C. LANCASTER.